United States Patent
Yuki

(10) Patent No.: US 11,260,383 B2
(45) Date of Patent: Mar. 1, 2022

(54) HONEYCOMB STRUCTURE

(71) Applicant: NGK INSULATORS, LTD., Nagoya (JP)

(72) Inventor: Kazuya Yuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 865 days.

(21) Appl. No.: 15/906,231

(22) Filed: Feb. 27, 2018

(65) Prior Publication Data

US 2018/0264452 A1 Sep. 20, 2018

(30) Foreign Application Priority Data

Mar. 14, 2017 (JP) .............................. JP2017-048704

(51) Int. Cl.
*B01D 53/94* (2006.01)
*B01J 35/04* (2006.01)
*B01D 46/24* (2006.01)
*B01D 46/00* (2006.01)

(52) U.S. Cl.
CPC ............ *B01J 35/04* (2013.01); *B01D 46/247* (2013.01); *B01D 46/2418* (2013.01); *B01D 53/944* (2013.01); *B01D 46/0061* (2013.01); *B01D 46/249* (2021.08); *B01D 2258/012* (2013.01); *B01D 2279/30* (2013.01)

(58) Field of Classification Search
USPC .......................................................... 428/116
IPC .......... B01D 46/247, 46/2418, 46/249, 46/0061, 53/944, 2258/012, 2249/30, 2279/30, 35/04
See application file for complete search history.

(56) References Cited

U.S. PATENT DOCUMENTS

2004/0166035 A1 8/2004 Noda et al.
2004/0209039 A1* 10/2004 Ichikawa ........... B01D 46/2459
428/116
2008/0000829 A1* 1/2008 Ichikawa ................. B01J 35/04
210/500.22

(Continued)

FOREIGN PATENT DOCUMENTS

JP H09-075750 A1 3/1997
JP 2003-033664 A1 2/2003
JP 2007-260618 A1 10/2007

OTHER PUBLICATIONS

Japanese Office Action (Application No. 2017-048704) dated Sep. 29, 2020 (with English translation).

Primary Examiner — Mary I Omori
(74) Attorney, Agent, or Firm — Burr & Brown, PLLC

(57) ABSTRACT

In a honeycomb structure, porous partition walls are arranged to surround cells extending from an inflow end face of the honeycomb structure body to an outflow end face thereof, intersection points at which the partition walls arranged in a latticed manner in the inflow end face intersect include a first intersection point that is one intersection point, and second intersection points one of which is the other intersection point in the partition wall including the first intersection point, and which are adjacent to the first intersection point, and the inflow end face has concave/convex portions each including the first intersection point as a bottom portion and the peripheral second intersection points of the first intersection point as top portions, or each including the first intersection point as a top portion and the peripheral second intersection points of the first intersection point as bottom portions.

5 Claims, 6 Drawing Sheets

(56) References Cited

U.S. PATENT DOCUMENTS

2009/0118121 A1 5/2009 Sarai
2012/0324852 A1* 12/2012 Simon, III ............ F01N 3/0222
55/522

* cited by examiner

HONEYCOMB STRUCTURE

The present application is an application based on JP 2017-048704 filed on Mar. 14, 2017 with Japan Patent Office, the entire contents of which are incorporated herein by reference.

BACKGROUND OF THE INVENTION

Field of the Invention

The present invention relates to a honeycomb structure, and more particularly, it relate to a honeycomb structure which is capable of effectively preventing cells on an inflow end face side from being closed due to particulate matter included in an exhaust gas, and inhibiting rise of pressure loss, when the honeycomb structure is used as a catalyst carrier onto which an exhaust gas purifying catalyst is to be loaded.

Description of the Related Art

Heretofore, exhaust gas purifying devices have been used in which honeycomb structures are used for purification treatments of toxic substances such as HC, CO and $NO_x$ included in exhaust gases emitted from engines of cars and the like. An example of the exhaust gas purifying device for a diesel engine is an exhaust gas purifying device including a diesel oxidation catalyst (hereinafter referred to also as "DOC") disposed in an exhaust passage and a diesel particulate filter (hereinafter referred to also as "DPF") disposed on a downstream side of the DOC. As described above, "DOC" is an abbreviation for "the diesel oxidation catalyst" and "DPF" is an abbreviation for "the diesel particulate filter".

As the DOC for use in such an exhaust gas purifying device as described above, for example, there has been suggested a honeycomb structure as a catalyst carrier onto which an oxidation catalyst to oxidize HC, CO or $NO_x$ is loaded (e.g., see Patent Document 1).

Furthermore, the DOC is not only used in the purification treatment of the toxic substances such as HC, CO and $NO_x$ but also used in raising a temperature of the exhaust gas flowing into the DPF during forced regeneration of the DPF. Here, the forced regeneration of the DPF is an operation of burning and removing particulate matter trapped and deposited in the DPF, to regenerate a filter function of the DPF. For example, during the forced regeneration of the DPF, post injection to inject a fuel behind a main burning injection period of the engine is performed, to supply the unburnt fuel into the exhaust gas purifying device. Then, this unburnt fuel is oxidized to generate heat by the DOC disposed on an upstream side of the DPF, thereby forcibly raising the temperature of the exhaust gas to perform the forced regeneration of the DPF.

The DOC is disposed closer to an upstream side of an exhaust system than the DPF having the filter function, the particulate matter is therefore deposited on the side of an inflow end face of the DOC, and cells on the side of the inflow end face of the DOC might be closed. As a technology to inhibit generation of a boundary film on the side of an inflow end face of the honeycomb structure for use as the catalyst carrier, for example, there has been suggested a technology to form the honeycomb structure so that its inflow end face is a surface having an angle other than a right angle to a gas inflow direction (e.g., see Patent Document 2).

[Patent Document 1] JP-A-2003-33664
[Patent Document 2] JP-A-H09-75750

SUMMARY OF THE INVENTION

Heretofore, as a method of preventing cells on the side of an inflow end face of a honeycomb structure for use as a catalyst carrier from being closed, for example, there has been studied a method of adjusting a partition wall thickness or a cell density and increasing an open area of cells on the inflow end face side. However, such a method has the problem that an adjustment range is restricted in consideration of compatibility with a purification performance and that it is difficult to sufficiently inhibit the closing of the cells. Furthermore, in this method, there are large structural restrictions on the honeycomb structure, and hence it might be difficult to realize a structure matched with use conditions.

Furthermore, in such a honeycomb structure as described in Patent Document 2, generation of a boundary film at a molecular diffusion level of an exhaust gas can be inhibited, but there is the problem that it is difficult to sufficiently inhibit closing of cells due to deposition of particulate matter including solid particulates. For example, in the honeycomb structure described in Patent Document 2, an inflow end face of the honeycomb structure is constituted to be corrugated along one direction. Consequently, an effect of inhibiting the closing of the cells is obtainable in an advancing direction of the above-mentioned "corrugation", but it is difficult to inhibit the closing of the cells in a direction perpendicular to the "corrugation" advancing direction.

The present invention has been developed in view of the problems of such conventional technologies as described above, and an object thereof is to provide a honeycomb structure which is capable of effectively preventing cells on an inflow end face side from being closed due to particulate matter included in an exhaust gas, and inhibiting rise of pressure loss, when the honeycomb structure is used as a catalyst carrier onto which an exhaust gas purifying catalyst is to be loaded.

According to the present invention, there is provided a honeycomb structure as follows.

According to a first aspect of the present invention, a honeycomb structure is provided including a pillar-shaped honeycomb structure body having porous partition walls, wherein the partition walls are arranged to surround a plurality of cells extending from an inflow end face of the honeycomb structure body to an outflow end face thereof, intersection points at which the partition walls arranged in a latticed manner in the inflow end face intersect include a first intersection point that is one intersection point, and a plurality of second intersection points one of which is the other intersection point in the partition wall including the first intersection point, and which are adjacent to the first intersection point, and the inflow end face has concave/convex portions each including the first intersection point as a bottom portion and the peripheral second intersection points of the first intersection point as top portions, or each including the first intersection point as a top portion and the peripheral second intersection points of the first intersection point as bottom portions.

According to a second aspect of the present invention, the honeycomb structure according to the above first aspect is provided, wherein a difference in height in the concave/convex portion in an extending direction of the cells is from 0.3 to 1.2 mm.

According to a third aspect of the present invention, the honeycomb structure according to the above first or second aspects is provided, wherein in the partition wall connecting the first intersection point to the second intersection point, an end on the side of the inflow end face has an inclined surface inclined along a shape of the concave/convex portion in an extending direction of the cells.

According to a fourth aspect of the present invention, the honeycomb structure according to any one of the above first to third aspects is provided, wherein the intersection points at which the partition walls intersect include a plurality of third intersection points one of which is an intersection point other than the first intersection point in the partition wall including the second intersection points, and which are adjacent to the second intersection points, and in the inflow end face, the first intersection point and at least one third intersection point are present at the same position in an extending direction of the cells.

According to a fifth aspect of the present invention, the honeycomb structure according to any one of the above first to third aspects is provided, wherein a shape of the cells in the inflow end face is quadrangular, and a percentage of a ratio of the number of the intersection points which are the first intersection points to a total number of the intersection points at which the partition walls intersect in the inflow end face is from 12 to 25%.

According to a sixth aspect of the present invention, the honeycomb structure according to any one of the above first to third aspects is provided, wherein a shape of the cells in the inflow end face is hexagonal, and a percentage of a ratio of the number of the intersection points which are the first intersection points to a total number of the intersection points at which the partition walls intersect in the inflow end face is from 25 to 50%.

According to a seventh aspect of the present invention, the honeycomb structure according to any one of the above first to sixth aspects is provided, wherein in the outflow end face, the respective intersection points at which the partition walls intersect are present at the same position in an extending direction of the cells.

A honeycomb structure of the present invention has, in its inflow end face, concave/convex portions each including a first intersection point as a bottom portion and peripheral second intersection points of the first intersection point as top portions, or each including the first intersection point as a top portion and the peripheral second intersection points of the first intersection point as bottom portions. Consequently, when the honeycomb structure is used as a catalyst carrier onto which an exhaust gas purifying catalyst is to be loaded, it is possible to effectively prevent cells on an inflow end face side from being closed due to particulate matter included in an exhaust gas, and inhibit rise of pressure loss.

Specifically, in the honeycomb structure of the present invention, its inflow end face is constituted in "a mortar shape in which the first intersection point is dented more inwardly than the peripheral intersection points of the first intersection point" or "a projection shape in which the first intersection point is bulged more outwardly than the peripheral intersection points of the first intersection point". Therefore, when the cell is surrounded with the partition walls including the first intersection point on the side of the inflow end face, ends of the partition walls surrounding the cell are stepped. Consequently, a distance between the partition walls which surround the cell can be increased without increasing an open area or the like of the cell. Therefore, in open ends of the cells on the inflow end face side of the honeycomb structure, bridges of particulate matter are hard to be formed, and the closing of the cells can effectively be prevented.

DETAILED DESCRIPTION OF THE PRESENT INVENTION

Hereinafter, description will be made as to embodiments of the present invention. However, the present invention is not limited to the following embodiments. Therefore, it should be understood that changes, improvements and the like are addable to the following embodiments on the basis of ordinary knowledge of a person skilled in the art without departing from the gist of the present invention.

(1) Honeycomb Structure:

As shown in FIG. 1 to FIG. 6, one embodiment of a honeycomb structure of the present invention is a honeycomb structure 100 including a pillar-shaped honeycomb structure body 4 having porous partition walls 1. The honeycomb structure 100 of the present embodiment is suitably usable as a catalyst carrier onto which an exhaust gas purifying catalyst is to be loaded. The honeycomb structure body 4 may further have, in its circumferential portion, a circumferential wall 3 disposed to surround the partition walls 1.

Figure 1:
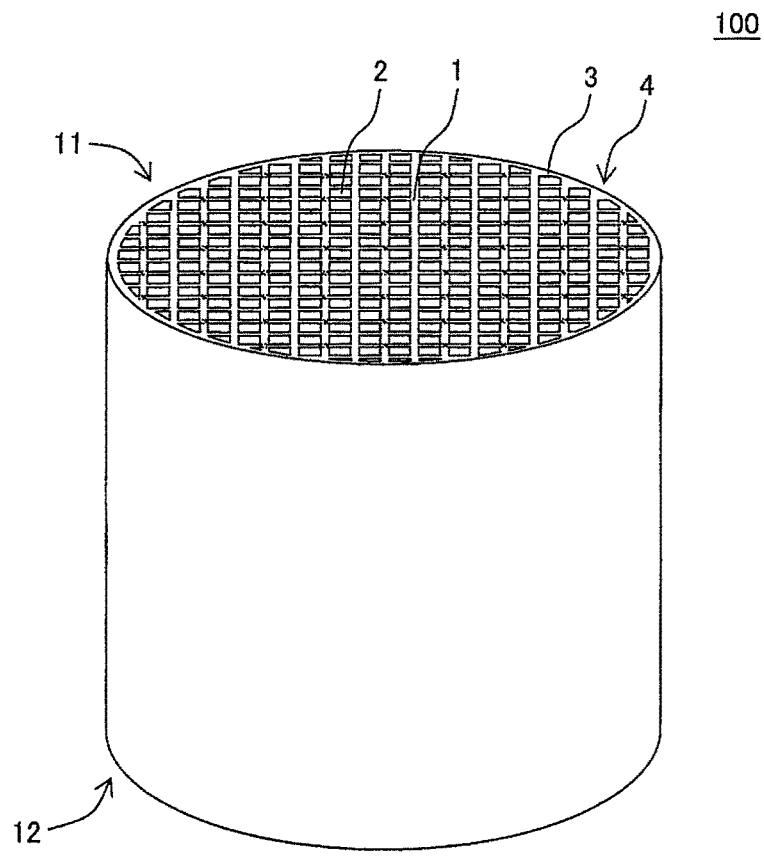
FIG. 1 is a perspective view schematically showing one embodiment of a honeycomb structure of the present invention.
Figure 2:
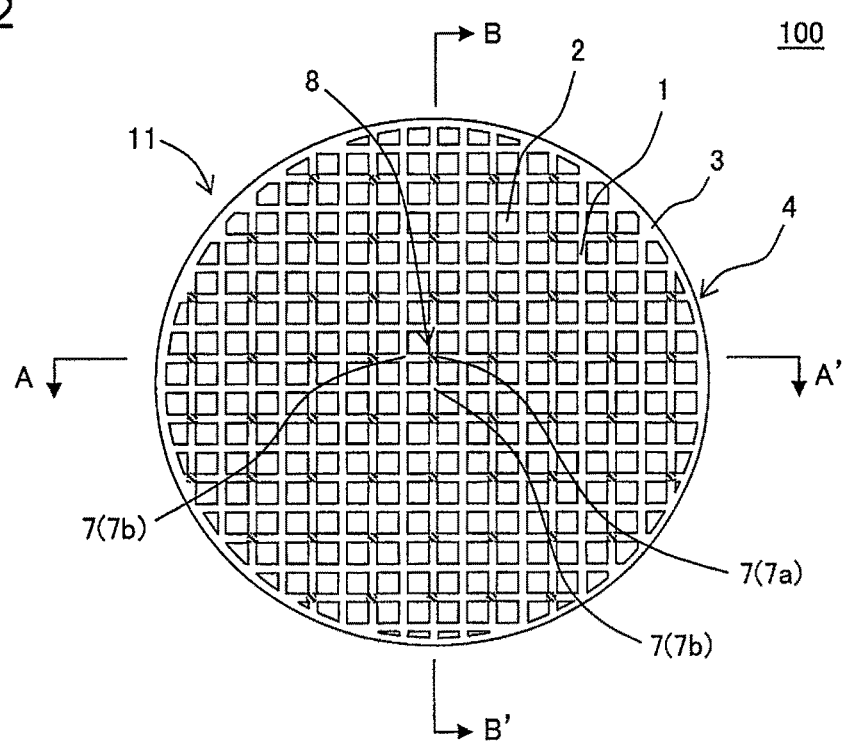
FIG. 2 is a plan view schematically showing an inflow end face of the honeycomb structure shown in FIG. 1.
Figure 3:
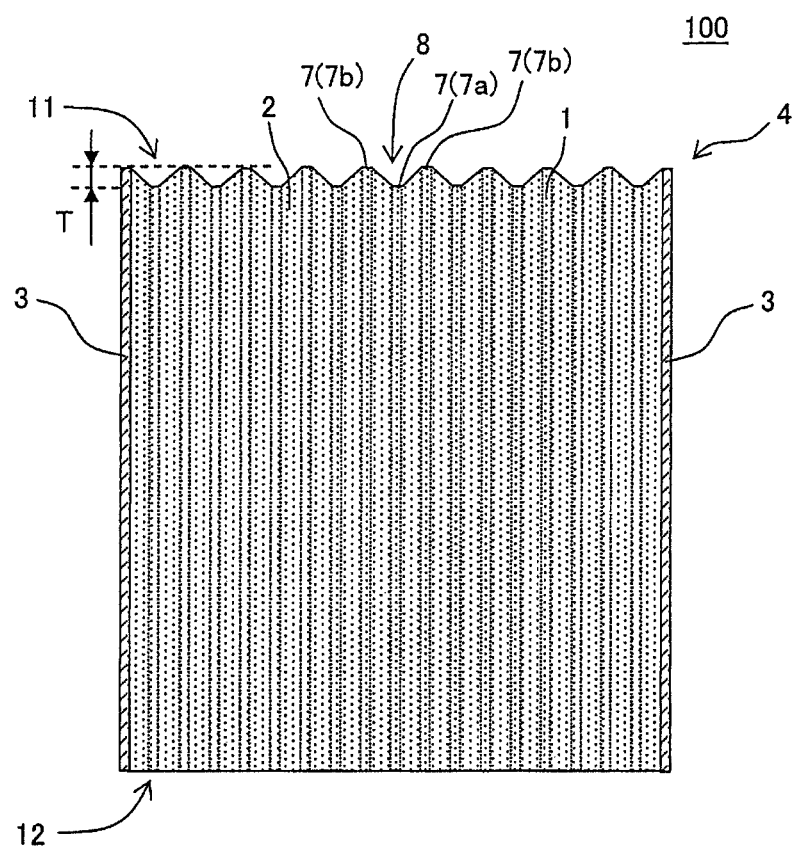
FIG. 3 is a cross-sectional view schematically showing a cross section taken along the A-A' line of FIG. 2.
Figure 4:
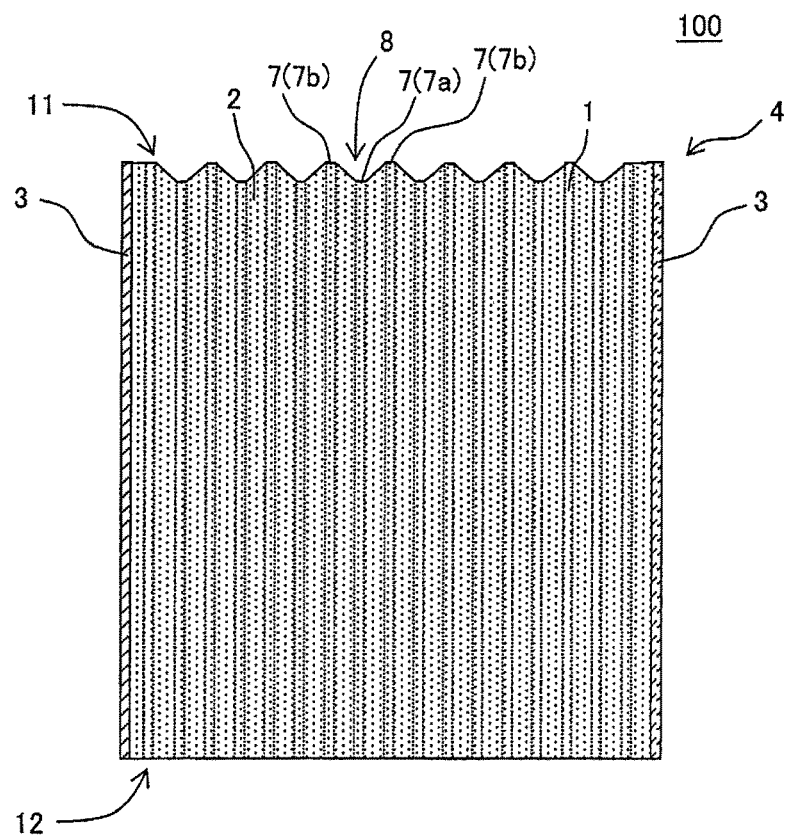
FIG. 4 is a cross-sectional view schematically showing a cross section taken along the B-B' line of FIG. 2.
Figure 5:
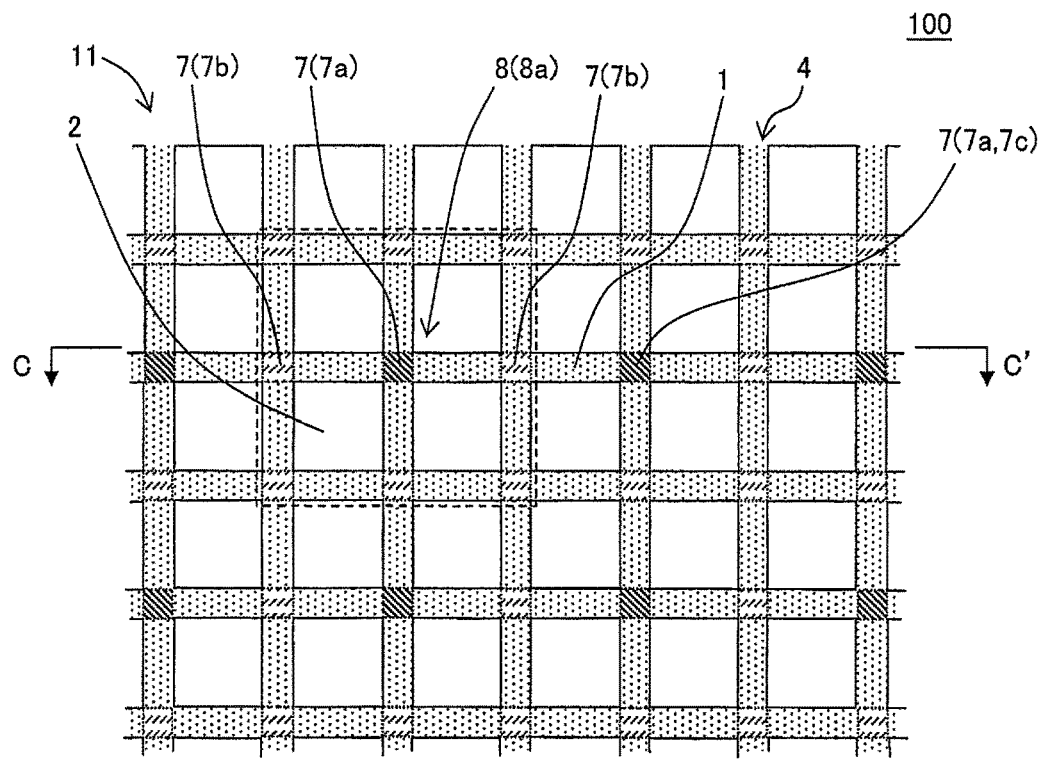
FIG. 5 is an enlarged plan view showing an enlarged part of the inflow end face of the honeycomb structure shown in FIG. 1.
Figure 6:
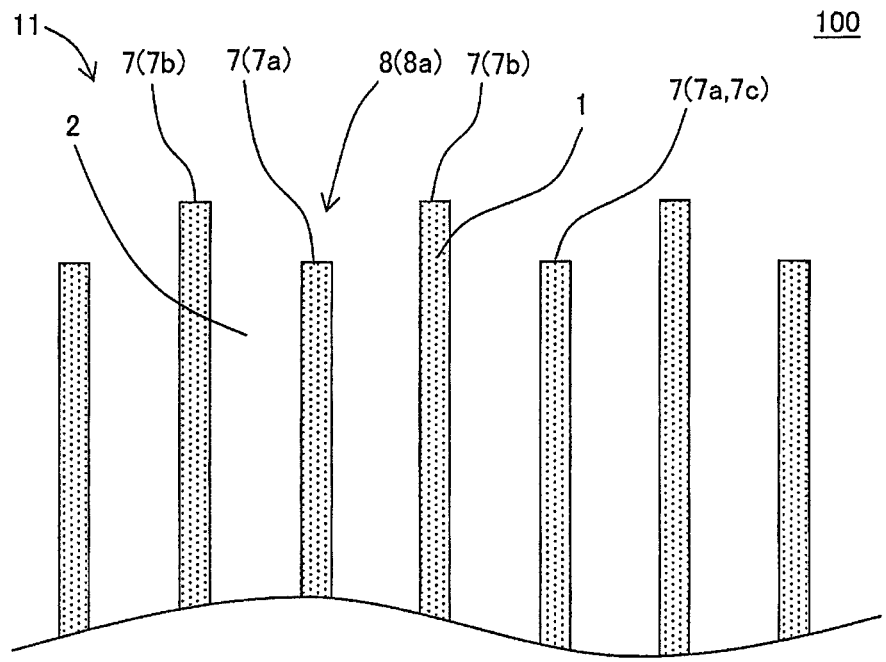
FIG. 6 is a cross-sectional view schematically showing a cross section taken along the C-C' line of FIG. 5.

Here, FIG. 1 is a perspective view schematically showing one embodiment of the honeycomb structure of the present invention. FIG. 2 is a plan view schematically showing an inflow end face of the honeycomb structure shown in FIG. 1. FIG. 3 is a cross-sectional view schematically showing a cross section taken along the A-A' line of FIG. 2. FIG. 4 is a cross-sectional view schematically showing a cross section taken along the B-B' line of FIG. 2. FIG. 5 is an enlarged plan view showing an enlarged part of the inflow end face of the honeycomb structure shown in FIG. 1. FIG. 6 is a cross-sectional view schematically showing a cross section taken along the C-C' line of FIG. 5.

In the honeycomb structure 100 of the present embodiment, the partition walls 1 constituting the honeycomb structure body 4 are arranged to surround a plurality of cells 2 extending from an inflow end face 11 of the honeycomb structure body 4 to an outflow end face 12 thereof. Therefore, the honeycomb structure body 4 is constituted in a pillar shape having the inflow end face 11 and the outflow end face 12 as both end faces, and has a honeycomb structure in which the above-mentioned plurality of cells 2 are defined by the partition walls 1.

In the inflow end face 11 of the honeycomb structure body 4, intersection points 7 at which the partition walls 1 arranged in a latticed manner intersect include first intersection points 7a and second intersection points 7b as follows. Each of the first intersection points 7a is one optional intersection point 7a among the plurality of intersection points 7. The second intersection points 7b are a plurality of second intersection points 7b each of which is the other intersection point 7 in the partition wall 1 each including the first intersection point 7a, and which are adjacent to the first intersection point 7a. It is to be noted that "the partition wall 1 including the first intersection point 7a" indicates the partition wall 1 which has two intersection points 7 on both sides of this partition wall 1 and in which the intersection point 7 on one side is the first intersection point 7a. Therefore, "the other intersection point 7b in the partition wall 1 including the first intersection point 7a" indicates the intersection point 7 other than the first intersection point 7a in two intersection points 7 on both the sides of the partition wall 1. "The plurality of intersection points 7b which are adjacent to the first intersection point 7a" are the other intersection points of the respective partition walls 1 intersecting at the first intersection point 7a on the inflow end face 11, and are the intersection points 7 of the partition walls 1 each of which is present at a position closest to the first intersection point 7a on the inflow end face 11.

The honeycomb structure 100 of the present embodiment especially has the main characteristics that the inflow end face 11 has concave/convex portions 8 each including first intersection point 7a as a bottom portion and the peripheral second intersection points 7b of the first intersection point 7a as top portions. Specifically, in the honeycomb structure 100 of the present embodiment, the inflow end face 11 is constituted in "a mortar shape in which the first intersection point 7a is dented more inwardly than the peripheral intersection points 7 of the first intersection point 7a". Consequently, the honeycomb structure 100 of the present embodiment is capable of effectively preventing the cells 2 on an inflow end face 11 side from being closed due to particulate matter included in the exhaust gas, and inhibiting rise of pressure loss.

More specifically, the inflow end face is constituted in "the mortar shape in which the first intersection point 7a is dented more inwardly than the peripheral intersection points 7 of the first intersection point 7a", whereby in the cell 2 surrounded with the partition walls 1 including the first intersection point 7a, ends of the partition walls 1 surrounding the cell 2 are stepped on the inflow end face 11 side. Consequently, a distance between the partition walls 1 which surround the cell 2 can be increased without increasing an open area or the like of the cells 2. Therefore, in open ends of the cells 2 on the inflow end face 11 side of the honeycomb structure 100, bridges of the particulate matter are hard to be formed, and the cells 2 can effectively be prevented from being closed.

It is to be noted that in FIG. 2 and FIG. 5, each region where the intersection point 7 (the first intersection point 7a in FIG. 5) dented more inwardly than the peripheral intersection points 7 is present among the intersection points 7 at which the partition walls 1 intersect is shown by hatching of right down solid lines (i.e., solid hatching). Furthermore, in FIG. 5, a region where the intersection point 7 (the second intersection point 7b in FIG. 5) bulged more outwardly than the first intersection point 7a is present among the intersection points 7 at which the partition walls 1 intersect is shown by hatching of right up broken lines (i.e., broken hatching).

Figure 8:
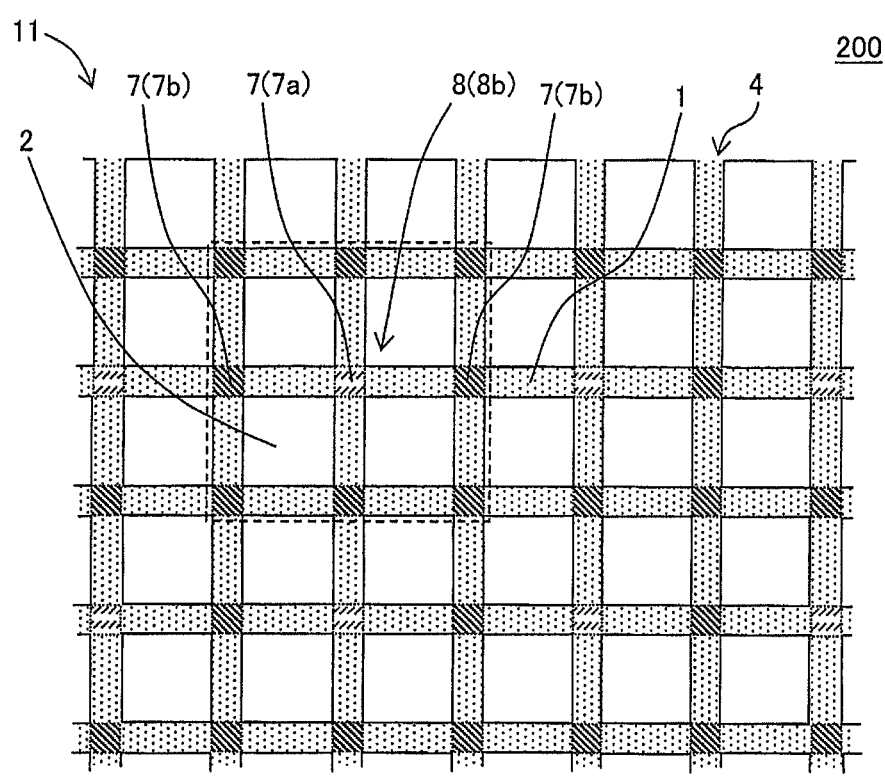
FIG. 8 is a plan view schematically showing an inflow end face of another embodiment of the honeycomb structure of the present invention, and an enlarged plan view showing an enlarged part of the inflow end face.

Additionally, according to the present invention, in the honeycomb structure, its inflow end face may be constituted in "a projection shape in which the first intersection point is bulged more outwardly than the peripheral intersection points of the first intersection point". Specifically, as shown in FIG. 8, the inflow end face 11 of the honeycomb structure body 4 may have concave/convex portions 8 each including the first intersection point 7a as a top portion and the peripheral second intersection points 7b of the first intersection point 7a as bottom portions. Here, FIG. 8 is a plan view schematically showing an inflow end face of another embodiment of the honeycomb structure of the present invention, and an enlarged plan view showing an enlarged part of the inflow end face. It is preferable that a honeycomb structure 200 shown in FIG. 8 is constituted similarly to the honeycomb structure 100 shown in FIG. 1 to FIG. 6 except that a constitution of a concave/convex portion 8 is different.

It is to be noted that in FIG. 8, each region where the intersection point 7 (the first intersection point 7a in FIG. 8) bulged more outwardly than the peripheral intersection points 7 is present among the intersection points 7 at which the partition walls 1 intersect is shown by hatching of right up broken lines (i.e., broken hatching). Furthermore, in FIG. 8, each region where the intersection point 7 (the second intersection point 7b in FIG. 8) dented more inwardly than the first intersection point 7a is present among the intersection points 7 at which the partition walls 1 intersect is shown by hatching of right down solid lines (i.e., solid hatching).

In the honeycomb structure 200 shown in FIG. 8, respective intersection points 7 constituting top portions and bottom portions of concave/convex portions 8 have a positional relation inverted to that in the honeycomb structure 100 shown in FIG. 1 to FIG. 6. Additionally, it is preferable that the honeycomb structure 200 shown in FIG. 8 is constituted similarly to the honeycomb structure 100 shown in FIG. 5, except that the respective intersection points 7 constituting the top portions and the bottom portions of the concave/convex portions 8 have the inverted positional relation as described above. Hereinafter, description will be made as to the honeycomb structure of the present invention in more detail, using the honeycomb structure 100 shown in FIG. 1 to FIG. 6 as an example.

As shown in FIG. 3 and FIG. 4, a difference T in height between the first intersection point and the second intersection point in the concave/convex portion 8 in an extending direction of the cells 2 is preferably from 0.3 to 1.2 mm, further preferably from 0.5 to 1.0 mm, and especially preferably from 0.7 to 1.0 mm. When the difference T in height is smaller than 0.3 mm, open ends of the cells 2 in the inflow end face 11 might easily be closed with the particulate matter included in the exhaust gas. When the difference T in height is in excess of 1.2 mm, strength of the honeycomb structure 100 deteriorates and, for example, the partition walls 1 on the inflow end face 11 side might easily be chipped.

As shown in FIG. 3 and FIG. 4, it is preferable that in the partition wall 1 connecting the first intersection point 7a to the second intersection point 7b, its end on the side of the inflow end face 11 has an inclined surface inclined along a shape of the concave/convex portion 8 in the extending direction of the cells 2. According to this constitution, on the inflow end face 11 side of the honeycomb structure body 4, the particulate matter is hard to be deposited on end faces of the partition walls 1, and the bridges of the particulate matter are harder to be formed in the open ends of the cells 2.

As shown in FIG. 5 and FIG. 6, when the intersection points at which the partition walls intersect include a plurality of third intersection points 7c each of which is an intersection point other than the first intersection point 7a in the partition wall 1 including the second intersection points 7b, and which are adjacent to the second intersection points 7b, it is preferable that the third intersection points 7c have the following constitution. That is, in the inflow end face 11 of the honeycomb structure body 4, the first intersection point 7a and at least one third intersection point 7c are present at the same position in the extending direction of the cells 2. Furthermore, it is further preferable that the third intersection point 7c is present as the bottom portion of the mortar shape which is dented more inwardly than the peripheral intersection points 7 or as the top portion of the projection shape which is bulged more outwardly than the peripheral intersection points 7. In this configuration, the third intersection point 7c can be regarded as "the different first intersection point 7a" in the honeycomb structure 100.

Figure 7:
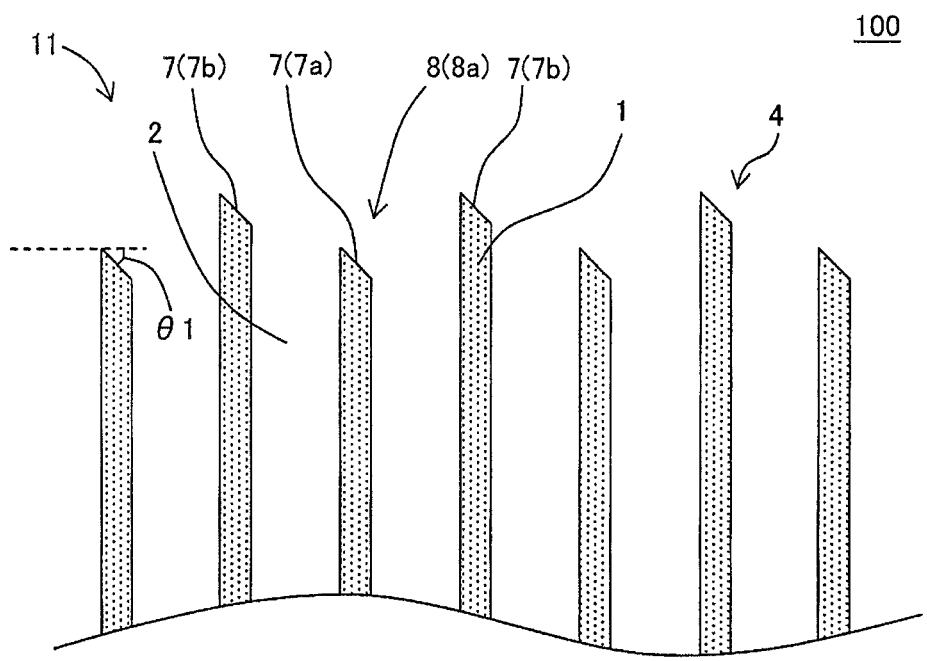
FIG. 7 is a cross-sectional view schematically showing another example of the cross section taken along the C-C' line of FIG. 5.

For example, as shown in FIG. 6, the intersection point 7 at which the partition walls 1 intersect may have an end face perpendicular to the extending direction of the cells 2 in the inflow end face 11. However, as shown in FIG. 7, the intersection point 7 at which the partition walls 1 intersect may have an inclined surface inclined to the extending direction of the cells 2 in the inflow end face 11. As shown in FIG. 7, when the intersection points 7 at which the partition walls 1 intersect have inclined surfaces, the particulate matter is hard to be deposited at the intersection points 7 at which the partition walls 1 intersect, and the bridges of the particulate matter are harder to be formed in the open ends of the cells 2. Here, FIG. 7 is a cross-sectional view schematically showing another example of the cross section taken along the C-C' line of FIG. 5.

In the inflow end face 11, when the intersection point 7 at which the partition walls 1 intersect have the inclined surface, there are not any special restrictions on its inclination angle. For example, such "an inclination angle θ1 of the inclined surface of the intersection point 7" as shown in FIG. 7 is preferably from 0 to 60° and further preferably from 45 to 60°. According to this constitution, it is possible to more effectively inhibit the particulate matter from being deposited at the intersection points 7. It is to be noted that "the inclination angle θ1 of the inclined surface of the intersection point 7" is the inclination angle θ1 of the inclined surface, when an angle of a surface parallel to a surface perpendicular to the extending direction of the cells 2 is 0°.

There are not any special restrictions on a thickness of the partition walls 1. For example, the thickness of the partition walls 1 is preferably from 0.05 to 0.3 mm, further preferably from 0.06 to 0.25 mm, and especially preferably from 0.09 to 0.17 mm. For example, when the thickness of the partition walls 1 is smaller than 0.05 mm, the strength of the honeycomb structure 100 deteriorates and, for example, the partition walls 1 on the inflow end face 11 side might easily be chipped. When the thickness of the partition walls 1 is in excess of 0.3 mm, the pressure loss of the honeycomb structure 100 might rise.

There are not any special restrictions on a cell density of the honeycomb structure body 4. For example, the cell density is preferably from 31 to 140 cells/cm$^2$, further preferably from 39 to 93 cells/cm$^2$, and especially preferably from 46 to 62 cells/cm$^2$. For example, when the cell density is smaller than 31 cells/cm$^2$, the strength of the honeycomb structure 100 might deteriorate. When the cell density is in excess of 140 cells/cm$^2$, the pressure loss of the honeycomb structure 100 might increase.

It is preferable that the partition walls 1 of the honeycomb structure body 4 are made of a material including ceramic. Furthermore, it is preferable that the material constituting the partition walls 1 includes at least one type of ceramic selected from "a material group" mentioned below. "The material group" is a group consisting of silicon carbide, a silicon-silicon carbide based composite material, cordierite, mullite, alumina, spinel, a silicon carbide-cordierite based composite material, lithium aluminum silicate, and aluminum titanate.

In the honeycomb structure 100 of the present embodiment, there are not any special restrictions on a shape of the cells 2 in a cross section perpendicular to the extending direction of the cells 2. In the present invention, the cell 2 means a space surrounded with the partition walls 1. Hereinafter, when "the shape of the cells 2" is simply mentioned, there is meant the shape of the cells 2 in the cross section perpendicular to the extending direction of the cells 2.

Examples of the shape of the cells 2 include polygonal shapes such as a triangular shape, a quadrangular shape, a pentagonal shape, a hexagonal shape, a heptagonal shape and an octagonal shape. Furthermore, any combination of these shapes is also a preferable configuration. Additionally, in the quadrangular shape, a square or a rectangle is preferable. In addition, when the shape of the cells 2 is polygonal, at least one corner of the polygonal shape may be curved or at least one corner thereof may linearly be chamfered.

When the shape of the cells 2 in the inflow end face 11 is quadrangular, it is preferable that a percentage of a ratio of the number of the intersection points which are the first intersection points 7a to a total number of the intersection points 7 at which the partition walls 1 intersect in the inflow end face 11 is from 12 to 25%. According to such a constitution, it is possible to more effectively inhibit the rise of the pressure loss. When the shape of the cells 2 is quadrangular and the percentage of the ratio of the number of the intersection points which are the first intersection points 7a is 25%, the inflow end face 11 of the honeycomb structure body 4 has, in its whole region, the concave/convex portions 8 constituted of the first intersection points 7a and the second intersection points 7b. Hereinafter, "the percentage of the ratio of the number of the intersection points which are the first intersection points 7a to the total number of the intersection points 7 at which the partition walls 1 intersect in the inflow end face 11" will occasionally simply be referred to as "the ratio of the first intersection points". When the shape of the cells 2 is quadrangular, the ratio of the first intersection points is further preferably from 20 to 25%.

Figure 9:
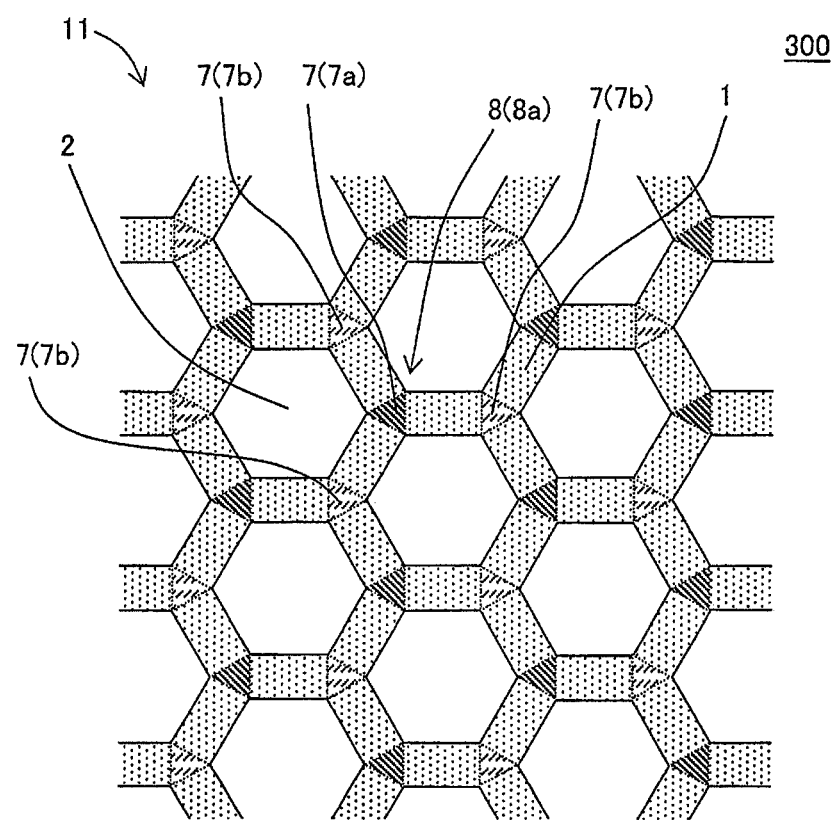
FIG. 9 is a plan view schematically showing an inflow end face of still another embodiment of the honeycomb structure of the present invention, and an enlarged plan view showing an enlarged part of the inflow end face.

As shown in FIG. 9, when the cells 2 in the inflow end face 11 are hexagonal, it is preferable that a percentage of a ratio of the number of the intersection points which are the first intersection points 7a to a total number of the intersection points 7 at which the partition walls 1 intersect in the inflow end face 11 is 25 to 50%. According to this constitution, it is possible to effectively inhibit the rise of the pressure loss. Here, FIG. 9 is a plan view schematically showing an inflow end face of still another embodiment of the honeycomb structure of the present invention, and an enlarged plan view showing an enlarged part of the inflow end face. When the cells 2 are hexagonal and the percentage of the ratio of the number of the intersection points which are the first intersection points 7a is 50%, the inflow end face 11 of the honeycomb structure body 4 has, in its whole region, the concave/convex portions 8 constituted of the first intersection points 7a and the second intersection points 7b. When the cells 2 are hexagonal, the ratio of the first intersection points is further preferably from 40 to 50%.

In a honeycomb structure 300 shown in FIG. 9, a cell 2 surrounded with partition walls 1 is hexagonal, and hence an intersection point 7 of the partition walls 1 has a Y-shape in which three partition walls 1 intersect. Consequently, one concave/convex portion 8 is constituted of one first intersection point 7a and three peripheral second intersection points 7b.

On the other hand, in the honeycomb structure 100 shown in FIG. 5, the cell 2 surrounded with the partition walls 1 is quadrangular, and hence the intersection point 7 of the partition walls 1 has a cross shape in which four partition walls 1 intersect. Consequently, one concave/convex portion 8 is constituted of one first intersection point 7a and four peripheral second intersection points 7b. However, when the cells 2 are quadrangular as in the honeycomb structure 100, it is more preferable that one concave/convex portion 8 is constituted of one first intersection point 7a and eight second intersection points 7b arranged to surround the first intersection point 7a.

In the honeycomb structure 100 of the present embodiment shown in FIG. 1 to FIG. 6, in the outflow end face 12, the respective intersection points at which the partition walls 1 intersect are present at the same position in the extending direction of the cells 2. Specifically, in the honeycomb structure 100, it is preferable that the outflow end face 12 does not have any concave/convex portions 8 including predetermined intersection points of the partition walls 1 as bottom portions or top portions. According to this constitution, a structure of the outflow end face 12 is further simplified and, for example, productivity of the honeycomb structure 100 can improve.

There are not any special restrictions on an outer shape of the honeycomb structure 100 (i.e., an overall shape of the honeycomb structure 100). Examples of the outer shape of the honeycomb structure 100 include a round pillar shape, an elliptic pillar shape, a prismatic columnar shape, and "a pillar shape in which a bottom surface has an indeterminate shape". Furthermore, there are not any special restrictions on a size of the honeycomb structure 100, but it is preferable that its length in the extending direction of the cells 2 is from 45 to 254 mm. Additionally, when the outer shape of the honeycomb structure 100 is the round pillar shape, it is preferable that a diameter of its bottom surface is from 55 to 355 mm.

The honeycomb structure 100 of the present embodiment is suitably usable as an exhaust gas purifying catalyst carrier for an internal combustion engine. The catalyst carrier is a porous structure which supports particulates of a catalyst. Therefore, it is preferable that in the respective cells 2 formed in the honeycomb structure body 4, their ends on the inflow end face 11 side and the outflow end face 12 side are not plugged with plugging portions and the like.

In the honeycomb structure 100 of the present embodiment, the exhaust gas purifying catalyst (not shown) may be loaded onto at least one of the surface of each partition wall 1 of the honeycomb structure body 4 and each pore of the partition wall 1 thereof. An example of the catalyst is a heretofore known catalyst for a car exhaust gas. Especially, an oxidation catalyst is a suitable example of the catalyst.

(2) Manufacturing Method of Honeycomb Structure:

Next, description will be made as to a manufacturing method of the honeycomb structure of the present invention.

When the honeycomb structure of the present invention is manufactured, a forming raw material to form a honeycomb formed body is initially prepared. It is preferable that the forming raw material contains a ceramic raw material.

It is preferable that an example of the ceramic raw material contained in the forming raw material is at least one type of ceramic selected from "a raw material group" mentioned below. "The raw material group" is a group consisting of silicon carbide, a silicon-silicon carbide based composite material, a cordierite forming raw material, cordierite, mullite, alumina, spinel, a silicon carbide-cordierite based composite material, lithium aluminum silicate, and aluminum titanate. By use of these raw materials, a honeycomb structure excellent in strength and heat resistance is obtainable. It is to be noted that the cordierite forming raw material is a ceramic raw material blended to obtain a chemical composition in which silica falls in a range of 42 to 56 mass %, alumina falls in a range of 30 to 45 mass %, and magnesia falls in a range of 12 to 16 mass %. Then, the cordierite forming raw material is fired to form cordierite.

It is preferable that the forming raw material is prepared by mixing the above ceramic raw material with a pore former, a binder, a dispersing agent, a surfactant, a dispersing medium and the like.

When the honeycomb formed body is formed by using the forming raw material, it is preferable that the forming raw material is initially kneaded to obtain a kneaded material and that the obtained kneaded material is formed in a honeycomb shape.

There are not any special restrictions on a method of kneading the forming raw material to obtain the kneaded material, and an example of the method is a method in which a kneader, a vacuum pugmill or the like is used.

There are not any special restrictions on a method of forming the kneaded material into the honeycomb formed body, and a forming method such as an extrusion method, an injection molding method or a press molding method is usable. It is preferable to employ the extrusion method, because continuous forming is easy and, for example, cordierite crystals can be oriented. The extrusion method can be performed by using the vacuum pugmill, a ram type extruder, a two-axis screw continuous extruder or the like. Furthermore, it is preferable to perform the extrusion by attaching, to a device for use in the extrusion, a die to form the honeycomb formed body having a desirable partition wall thickness, cell pitch, cell shape or the like.

Next, the concave/convex portions may be formed in one end face of the honeycomb formed body by the following method. Initially, a concave/convex member corresponding to an interval of intersection points of partition walls (i.e., a pitch of the intersection points of the partition walls) is prepared. Next, the prepared concave/convex member is pressed onto the one end face of the honeycomb formed body. In this way, the one end face of the honeycomb formed body is deformed to have an inverted shape of the concave/convex member, thereby forming the concave/convex portions in the one end face. It is to be noted that the formation of the concave/convex portions is not limited to such a method as described above. For example, the concave/convex portions are not formed in the honeycomb formed body, but the concave/convex portions may be formed after the honeycomb formed body is dried or the honeycomb formed body is fired.

It is preferable to dry the obtained honeycomb formed body after the honeycomb formed body is formed. There are not any special restrictions on a drying method, but examples of the method include hot air drying, microwave drying, induction drying, drying under reduced pressure, vacuum drying, and freeze drying. Among these methods, it is preferable to perform one or any combination of the induction drying, the microwave drying and the hot air drying because the whole honeycomb formed body can immediately and uniformly be dried. Furthermore, drying conditions can appropriately be determined in accordance with the drying method.

Next, main firing is performed on the honeycomb formed body to prepare the honeycomb structure. "The main firing" means an operation of sintering and densifying the forming raw material constituting the honeycomb formed body, to acquire a predetermined strength.

Then, the concave/convex portions may be formed in one end face of the honeycomb structure which is fired and obtained by the following method. An example of a concave/convex portion forming method is a method of polishing one end face of the honeycomb structure by use of a polishing machine having a concave and convex polishing surface, thereby forming the concave/convex portions in the one end face of the honeycomb structure. It is to be noted that one end face of the honeycomb formed body before fired (i.e., the dried honeycomb formed body) may be polished with the above polishing machine, to form the concave/convex portions.

It is preferable to calcinate the honeycomb formed body before the main firing is performed on the honeycomb formed body. The calcinating is performed for degreasing, and there are not any special restrictions on a calcinating method as long as an organic material such as the binder, the dispersing agent or the pore former in the honeycomb formed body can be removed. In general, a burning temperature of the organic binder is from about 100 to 300° C. A burning temperature of the pore former varies with its type, but is from about 200 to 1000° C. Therefore, as calcinating conditions, it is preferable to perform heating at about 200 to 1000° C. in an oxidation atmosphere for about 3 to 100 hours.

Firing conditions in the main firing vary with the type of forming raw material, and hence appropriate conditions may be selected in accordance with the type. Here, the firing conditions include a firing temperature, a firing time, a firing atmosphere and the like in performing the firing. For example, when the cordierite forming raw material is used, the highest firing temperature is preferably from 1410 to 1440° C. Furthermore, a holding time of the highest temperature during the firing is preferably from 3 to 15 hours.

EXAMPLES

Hereinafter, the present invention will further specifically be described on the basis of examples, but the present invention is not limited to these examples.

Example 1

Talc, kaolin, alumina, silica and aluminum hydroxide were prepared and mixed to obtain a cordierite forming raw material. The cordierite forming raw material is obtained by blending talc, kaolin, alumina, silica and aluminum hydroxide at a predetermined ratio to obtain a chemical composition in which $SiO_2$ fell in a range of 42 to 56 mass %, $Al_2O_3$ fell in a range of 30 to 45 mass % and MgO fell in a range of 12 to 16 mass %.

Next, a pore former, methylcellulose as a binder and water as a dispersing medium were added to the obtained cordierite forming raw material and mixed to obtain a forming raw material. 5 parts by mass of the pore former was added to 100 parts by mass of the cordierite forming raw material. 5 parts by mass of the binder was added to 100 parts by mass of the cordierite forming raw material. 37 parts by mass of the dispersing medium was added to 100 parts by mass of the cordierite forming raw material.

Then, the obtained forming raw material was kneaded, thereby obtaining a kneaded material to form a honeycomb formed body.

Next, the kneaded material was extruded by using a predetermined die, thereby obtaining the honeycomb formed body having partition walls arranged to surround a plurality of cells. In the honeycomb formed body, the shape of the cells was square and its overall shape was a round pillar shape.

Then, the obtained honeycomb formed body was dried with hot air at 120° C. and then fired at 1400 to 1430° C. for 10 hours, thereby preparing a honeycomb fired body. Next, one end face of the honeycomb fired body was polished by using a polishing machine having a concave and convex polishing surface, thereby forming concave/convex portions in one end face of the honeycomb fired body. In this way, a honeycomb structure of Example 1 was prepared. The obtained honeycomb structure had a round pillar shape in which a diameter of a surface perpendicular to a cell extending direction was 144 mm and a length in the cell extending direction was 155 mm. In the honeycomb structure, a partition wall thickness was 0.165 mm and a cell density was 62 cells/cm$^2$. Table 1 shows "a partition wall thickness" and "a cell density" as to the honeycomb structure of Example 1.

In the honeycomb structure, a porosity of the partition walls was 35%. The porosity of the partition walls was measured with AutoPore 9500 (tradename) manufactured by Micromeritics Instrument Corp.

The honeycomb structure of Example 1 had, in one end face, mortar-shaped concave/convex portions each including one intersection point at which the partition walls intersected as a bottom portion and the other peripheral intersection points as top portions. Table 1 shows a constitution of the concave/convex portions in the honeycomb structure of Example 1 in columns of "presence/absence of the concave/convex portions" and "a shape of the concave/convex portions". Additionally, in the honeycomb structure of Example 1, one end face having the concave/convex portions was an inflow end face into which a fluid such as an exhaust gas flowed.

In the one end face of the honeycomb structure, the concave/convex portions were present over the whole region of the one end face. When one intersection point forming the bottom portion of the concave/convex portion was a first intersection point and the other intersection points forming the top portions of the concave/convex portion were second intersection points, a percentage of a ratio of the number of the intersection points which were the first intersection points to a total number of the intersection points was 25%. Table 1 shows a value of the above-mentioned percentage of the ratio of the number of the intersection points which are the first intersection points in a column of "a ratio (%) of the first intersection points". Furthermore, a difference in height between the first intersection point and the second intersection point in the concave/convex portion was 1.0 mm. Table 1 shows the result.

Furthermore, in the pressure loss evaluation, the value of "the pressure loss rise ratio (%)" of the honeycomb structure of an evaluation target was compared with a value of "the pressure loss rise ratio (%)" of a honeycomb structure that was a standard, and evaluation concerning the pressure loss

TABLE 1

| | Cell shape | Partition wall thickness (mm) | Cell density (cells/cm$^2$) | Presence/ absence of concave/ convex portion | Shape of concave/ convex portion | Difference in height in the concave/ convex portion (mm) | Ratio (%) of first intersection points | Pressure loss evaluation Evaluation | Pressure loss rise ratio (%) |
|---|---|---|---|---|---|---|---|---|---|
| Example 1 | Quadrangular | 0.165 | 62 | Present | Mortar shape | 1.0 | 25 | A | 95 |
| Example 2 | Quadrangular | 0.165 | 62 | Present | Mortar shape | 0.3 | 25 | B | 120 |
| Example 3 | Quadrangular | 0.165 | 62 | Present | Mortar shape | 1.0 | 12 | A | 115 |
| Comparative Example 1 | Quadrangular | 0.165 | 62 | None | — | — | — | — | 145 |
| Example 4 | Quadrangular | 0.132 | 46 | Present | Mortar shape | 1.0 | 25 | A | 75 |
| Example 5 | Quadrangular | 0.132 | 46 | Present | Mortar shape | 0.3 | 25 | B | 105 |
| Comparative Example 2 | Quadrangular | 0.132 | 46 | None | — | — | — | — | 120 |
| Example 6 | Hexagonal | 0.109 | 62 | Present | Mortar shape | 1.0 | 50 | A | 100 |
| Example 7 | Hexagonal | 0.109 | 62 | Present | Mortar shape | 0.3 | 50 | B | 125 |
| Example 8 | Hexagonal | 0.109 | 62 | Present | Mortar shape | 1.0 | 25 | A | 118 |
| Comparative Example 3 | Hexagonal | 0.109 | 62 | None | — | — | — | — | 150 |
| Example 9 | Quadrangular | 0.165 | 62 | Present | Projection shape | 1.0 | 25 | A | 95 |
| Example 10 | Quadrangular | 0.165 | 62 | Present | Projection shape | 0.3 | 25 | B | 120 |
| Example 11 | Quadrangular | 0.132 | 46 | Present | Projection shape | 1.0 | 25 | A | 75 |
| Example 12 | Quadrangular | 0.132 | 46 | Present | Projection shape | 0.3 | 25 | B | 105 |
| Example 13 | Hexagonal | 0.109 | 62 | Present | Projection shape | 1.0 | 50 | A | 100 |
| Example 14 | Hexagonal | 0.109 | 62 | Present | Projection shape | 0.3 | 50 | B | 125 |
| Comparative Example 4 | Quadrangular | 0.165 | 62 | End face is corrugated | — | 1.0 | — | C | 140 |

An oxidation catalyst was loaded onto the honeycomb structure of Example 1, and "pressure loss evaluation" was performed to the honeycomb structure onto which the oxidation catalyst was loaded by the following method. Table 1 shows the result.

(Pressure Loss Evaluation)

A burning gas including soot was generated by using a burner in which light oil was a fuel. The generated burning gas was mixed with a predetermined amount of air, to prepare a mixed gas so that a flow rate of the whole gas was 1.5 Nm$^3$/min. Then, the mixed gas prepared in this manner was introduced into the honeycomb structure. A temperature of the mixed gas was 200° C. When the mixed gas started to be introduced, pressures were measured on an inflow end face side and an outflow end face side of the honeycomb structure. A pressure difference between the measured pressure on the inflow end face side and the measured pressure on the outflow end face side was obtained, and the obtained pressure difference was "initial pressure loss A" of the honeycomb structure. Then, the mixed gas was continued to flow into the honeycomb structure for 6 hours, and the pressures were measured on the inflow end face side and the outflow end face side of the honeycomb structure. A pressure difference between the measured pressure on the inflow end face side and the measured pressure on the outflow end face side was obtained, and the obtained pressure difference was the measured "pressure loss B" of the honeycomb structure. Then, "a pressure loss rise ratio (%)" was obtained from values of the initial pressure loss A and the pressure loss B on the basis of Equation (1) mentioned below.

the pressure loss rise ratio (%)=(the pressure loss $B$–the initial pressure loss $A$)/the initial pressure loss $A$×100%   Equation (1):

rise ratio was performed. Specifically, "an evaluation ratio" was obtained by dividing the value of "the pressure loss rise ratio (%)" of the honeycomb structure of the evaluation target by the value of "the pressure loss rise ratio (%)" of the honeycomb structure of the standard, and this "evaluation ratio" was evaluated on the basis of the following evaluation criteria. Additionally, in Examples 1 to 3, 9 and 10 and Comparative Example 4, Comparative Example 1 was the standard. In Examples 4, 5, 11 and 12, Comparative Example 2 was the standard. In Examples 6 to 8, 13 and 14, Comparative Example 3 was the standard.

Evaluation A: When the evaluation ratio is smaller than 0.8, the result is excellent and evaluation A is obtained.

Evaluation B: When the evaluation ratio is 0.8 or more and smaller than 0.95, the result is good and evaluation B is obtained.

Evaluation C: When the evaluation ratio is 0.95 or more, the result is failure and evaluation C is obtained.

Examples 2 to 8

The procedure of Example 1 was repeated to prepare honeycomb structures of Examples 2 to 8 except that a cell shape, a partition wall thickness, a cell density and a constitution of a concave/convex portion were changed as shown in Table 1.

Examples 9 to 14

In each of Examples 9 to 14, there was prepared a honeycomb structure having, in one end face, a projection-shaped concave/convex portion including one intersection point at which partition walls intersected as a top portion and the other peripheral intersection points as bottom portions.

Table 1 specifically shows a cell shape, a partition wall thickness, a cell density and a constitution of the concave/convex portion.

Comparative Examples 1 to 3

In each of Comparative Examples 1 to 3, a honeycomb structure was prepared without forming any concave/convex portions in one end face of the honeycomb structure. Specifically, the honeycomb structure of Comparative Example 1 was a honeycomb structure constituted so that each of an inflow end face and an outflow end face was flat. Table 1 specifically shows a cell shape, a partition wall thickness, a cell density and a constitution of the concave/convex portion.

Comparative Example 4

In Comparative Example 4, one end face of a honeycomb structure was processed so that ends of partition walls were stepped every other row, among rows including the partition walls arranged in a latticed manner, and extending in one direction. Specifically, as the honeycomb structure of Comparative Example 4, the honeycomb structure having a corrugated end face was prepared so that in one end face, one row of partition walls extending in one direction was "a valley" and two rows adjacent to the one row were "mountains". In the corrugated end face, as described above, one row and two adjacent rows constituted a corrugated form of one period. In the honeycomb structure of Comparative Example 4, the one end face processed in the corrugated form as described above was an inflow end face into which a fluid such as an exhaust gas flowed.

As to the honeycomb structures of Examples 2 to 14 and Comparative Examples 1 to 4, an oxidation catalyst was loaded by a method similar to that in Example 1, and "pressure loss evaluation" was performed by the above-mentioned method. Table 1 shows the results.

(Result)

The honeycomb structures of Examples 1 to 3, 9 and 10 had a pressure loss rise ratio smaller than that of the honeycomb structure of Comparative Example 1. The honeycomb structures of Examples 4, 5, 11 and 12 had a pressure loss rise ratio smaller than that of the honeycomb structure of Comparative Example 2. The honeycomb structures of Examples 6 to 8, 13 and 14 had a pressure loss rise ratio smaller than that of the honeycomb structure of Comparative Example 3. Therefore, in the pressure loss evaluation, all the honeycomb structures of Examples 1 to 14 had the result of evaluation A or B. On the other hand, in the honeycomb structure of Comparative Example 4, decrease of the pressure loss rise ratio was remarkably small as compared with the honeycomb structure of Comparative Example 1 that was the standard. Consequently, the honeycomb structure of Comparative Example 4 had the result of evaluation C in the pressure loss evaluation.

A honeycomb structure of the present invention is utilizable as a catalyst carrier onto which a catalyst to purify an exhaust gas emitted from a gasoline engine, a diesel engine or the like is to be loaded.

DESCRIPTION OF REFERENCE NUMERALS

1: partition wall, 2: cell, 3: circumferential wall, 4: honeycomb structure body, 7: intersection point (the intersection point at which the partition walls arranged in a latticed manner intersect), 7a: intersection point (a first intersection point), 7b: intersection point (a second intersection point), 7c: intersection point (a third intersection point), 8: concave/convex portion, 8a: mortar-shaped concave/convex portion, 8b: projection-shaped concave/convex portion, 11: inflow end face, 12: outflow end face, and 100, 200 and 300: honeycomb structure.

What is claimed is:

1. A honeycomb structure comprising a pillar-shaped honeycomb structure body having porous partition walls, wherein
the porous partition walls are arranged to surround a plurality of cells extending from an inflow end face of the honeycomb structure body to an outflow end face thereof,
intersection points at which the porous partition walls arranged in a latticed manner in the inflow end face intersect consist of first intersection points wherein, at least one first intersection point of the first intersection points is not adjacent to any other first intersection points, and a plurality of second intersection points, wherein one of the plurality of second intersection points is an other intersection point in a porous partition wall of the porous partition walls including the at least one first intersection point of the first intersection points, and which are adjacent to the at least one first intersection point of the first intersection points,
the inflow end face has concave/convex portions each including the first intersection points as top portions and all the second intersection points, which are adjacent to the first intersection points, as bottom portions, and
wherein a difference in height in the concave/convex portions in an extending direction of the plurality of cells is from 0.3 to 1.2 mm.

2. The honeycomb structure according to claim 1, wherein in the porous partition wall connecting the at least one first intersection point of the first intersection points to each second intersection point of the plurality of second intersection points, an end on the side of the inflow end face has an inclined surface inclined along a shape of the concave/convex portions in the extending direction of the plurality of cells.

3. The honeycomb structure according to claim 1, wherein a shape of the plurality of cells in the inflow end face is quadrangular, and
a percentage of a ratio of the number of the intersection points which are the first intersection points to a total number of the intersection points at which the porous partition walls intersect in the inflow end face is from 12 to 25%.

4. The honeycomb structure according to claim 1, wherein a shape of the plurality of cells in the inflow end face is hexagonal, and
a percentage of a ratio of a number of the intersection points which are the first intersection points to a total number of the intersection points at which the porous partition walls intersect in the inflow end face is from 25 to 50%.

5. The honeycomb structure according to claim 1, wherein in the outflow end face, the respective intersection points at which the porous partition walls intersect are present at the same position in the extending direction of the plurality of cells.

* * * * *